(12) United States Patent
Kaye (10) Patent No.: US 10,321,638 B2
(45) Date of Patent: Jun. 18, 2019

(54) SYSTEM, DEVICE, AND METHOD FOR PROCESSING A LENGTH OF MATERIAL

(71) Applicant: Waratah NZ Limited, Tokoroa (NZ)

(72) Inventor: Brett James Kaye, Tauranga (NZ)

(73) Assignee: WARATAH NZ LIMITED, Tokoroa (NZ)

( * ) Notice: Subject to any disclaimer, the term of this patent is extended or adjusted under 35 U.S.C. 154(b) by 1002 days.

(21) Appl. No.: 14/194,325

(22) Filed: Feb. 28, 2014

(65) Prior Publication Data

US 2014/0238545 A1    Aug. 28, 2014

(30) Foreign Application Priority Data

Feb. 28, 2013  (NZ) ........................................ 607685

(51) Int. Cl.
*A01G 23/02* (2006.01)
*A01G 23/095* (2006.01)

(52) U.S. Cl.
CPC ........... *A01G 23/02* (2013.01); *A01G 23/095* (2013.01)

(58) Field of Classification Search
CPC ..... A01G 23/02; A01G 23/095; F01D 11/006; F01D 5/3015; F01D 5/323
USPC ......... 702/33, 158; 144/4.6, 343, 357, 24.13
See application file for complete search history.

(56) References Cited

U.S. PATENT DOCUMENTS

| | | | | | |
|---|---|---|---|---|---|
| 4,294,295 | A | * | 10/1981 | Olin | .......................... B27B 5/18 144/195.1 |
| 5,457,635 | A | * | 10/1995 | Scott | ....................... B27B 1/007 144/357 |
| 2007/0251600 | A1 | * | 11/2007 | Lennartsson | ........ A01G 23/083 144/343 |
| 2011/0088816 | A1 | * | 4/2011 | Arvidsson | ............ A01G 23/099 144/357 |
| 2011/0265912 | A1 | * | 11/2011 | Arvidsson | ............ A01G 23/083 144/343 |
| 2012/0018041 | A1 | * | 1/2012 | Hanne | ................... A01G 23/083 144/24.13 |
| 2014/0012538 | A1 | * | 1/2014 | Kaye | ....................... G01B 7/042 702/158 |
| 2015/0195999 | A1 | * | 7/2015 | Kohio | ................... A01G 23/095 144/24.13 |

* cited by examiner

*Primary Examiner* — Mohammed Shamsuzzaman
(74) *Attorney, Agent, or Firm* — Klintworth & Rozenblat IP, LLP (57) ABSTRACT

A system, device, and method for processing a length of material are provided. A material-working device has first and second cutting devices, each having different cutting capacities. Data relating to the length and diameter at a plurality of points of the material is received, and used to determine at least one cutting position along its length. The diameter of the length of material at the cutting position is determined, and used to select either the first cutting device or second cutting device for use in performing a cut at the cutting position based on the cutting capacity of each cutting device.

8 Claims, 5 Drawing Sheets

SYSTEM, DEVICE, AND METHOD FOR PROCESSING A LENGTH OF MATERIAL

CROSS-REFERENCE TO RELATED APPLICATION(S)

This application claims priority under 35 U.S.C. § 119 to New Zealand Patent Application No. 607685, filed Feb. 28, 2013, the entire contents of which are incorporated herein by reference.

STATEMENT OF FEDERALLY SPONSORED RESEARCH OR DEVELOPMENT

Not applicable.

FIELD OF THE DISCLOSURE

The present disclosure relates to a system, device, and method for processing a length of material. In particular this disclosure relates to a method and apparatus for processing a portion of wood such as a stem, log, or other piece of wood.

BACKGROUND OF THE DISCLOSURE

The modern forestry industry is continually seeking to improve efficiency in processing timber. It is well-known to mount a timber-working device to a carrier vehicle in order to perform a number of operations in connection with timber processing. These operations may include one, or a combination of, grappling and felling a standing tree, delimbing a felled stem, debarking the stem, and cutting the stem into logs. Devices commonly known as harvester heads typically have the capability to perform all of these functions.

Many such harvester heads have the ability to measure the diameter and length of a log and automatically determine the optimal position of saw cuts in order to maximize the value of that log. Previously, an operator may have been required to calculate optimal value manually, or manually control the harvester head to perform cutting at points previously measured and marked. Automation of this process would be expected to improve productivity. However, elements of the process still currently require decision making on the part of the operator.

In particular, harvester heads commonly include two chainsaws—one at each end of the head. One of these chainsaws is typically designated as the "main" saw, having greater cutting capabilities in terms of stem diameter. The other chainsaw is usually used only for "topping" the stem—removing the undesirable end of the stem which is below a certain diameter—and as such the "top" saw generally has lower cutting capabilities than the main saw.

During typical operation of a harvester head—especially the processing of heavy limbed trees—a felled stem will be delimbed by feeding the stem through delimbing knives while logging the length and diameter of the stem. A cutting solution will then be determined based on the measured parameters.

Delimbing is generally performed from the largest diameter end of the stem—known as the Large End Diameter (LED)—in order to ensure that the harvester head may maintain a grip on the stem and allow the more valuable part of the stem to be processed. As such, the cutting solution is generally determined after the harvester head has arrived at the Small End Diameter (SED) of the stem.

Once a cutting solution has been determined the stem is usually reversed to the end of the stem with the LED, in order than the stem may be driven to the next cutting position, and the main saw used to cut the log. Following this method eliminates the need for the operator to make a decision regarding selection of the appropriate saw to make the first cut—reducing operator fatigue and maintaining operating efficiency. The process is continued to the last log length of the cutting solution, where the top saw is used to make the final cut.

This has several problems associated with it. In particular, the method requires the harvester to travel along the length of the stem three times—once for delimbing and measurement of the stem, once to return to the LED, and once to carry out the cutting solution. This adds to the fuel requirements of operating the head, and adds to the processing time—reducing the cost effectiveness of the harvester.

Further, it is generally desirable to reduce the number of passes a harvester head needs to make along the stem in order to reduce the damage to the stem by the feed mechanism—particularly for softer or ornamental wood where the value may decrease with bruising.

In some setups, the operator can choose whether to use the main or top saw to cut the stem at each position to achieve the cutting solution. This requires the operator to assess whether the diameter of the stem at a particular position is greater than the cutting capacity of the top saw, or whether the stem should be driven to the LED in order to process the stem as described above. This step takes time and causes operator stress and fatigue, which may in turn lead to poor decision making with regard to control of the harvester head and lost value to the forest owner.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise" or "include", or variations thereof such as "comprises", "includes", "comprising", or "including" will be understood to imply the inclusion of a stated element, integer or step, or group of elements integers or steps, but not the exclusion of any other element, integer or step, or group of elements, integers or steps.

Further aspects and advantages of the present disclosure will become apparent from the ensuing description which is given by way of example only.

SUMMARY OF THE DISCLOSURE

According to an exemplary embodiment of the disclosure there is provided an electronic control device for a material-working device including a first cutting device having a first cutting capacity, and a second cutting device having a second cutting capacity. The control device may comprise at least one processor. The at least one processor may be configured to receive data relating to the length of a length of material being processed by the material-working device and the diameter of the length of material at a plurality of points along its length. The at least one processor may further be configured to set at least one cutting position along the length of the length of material based on at least the length of the length of material. The at least one processor may further be configured to determine the diameter of the length of material at the cutting position using at least the data relating to the diameter of the length of material at the plurality of points along its length. The at least one processor may further be configured to select either the first cutting device or second cutting device for use in cutting the length of material at the cutting position based at least in part on the cutting capacity of each cutting device and the diameter of the length of material at the cutting position.

According to an exemplary embodiment of the disclosure there is provided a system for processing a length of material. The system may comprise a material-working device. The material-working device may comprise a first cutting device having a first cutting capacity, and a second cutting device having a second cutting capacity. The material-working device may also comprise a drive mechanism configured to drive the length of material relative to the material-working device, at least one distance measuring device, and at least one diameter measuring device. The system may comprise at least one processor. The at least one processor may be configured to receive data relating to the length of the length of material from the distance measuring device. The at least one processor may be configured to receive data relating to the diameter of the length of material at a plurality of points along its length from the diameter measuring device. The at least one processor may be configured to set at least one cutting position along the length of the length of material based on at least the length of the length of material. The at least one processor may be configured to determine the diameter of the length of material at the cutting position using at least the data relating to the diameter of the length of material at the plurality of points along its length. The at least one processor may be configured to select either the first cutting device or second cutting device for use in cutting the length of material at the cutting position based at least in part on the cutting capacity of each cutting device and the diameter of the length of material at the cutting position.

According to an exemplary embodiment of the present disclosure there is provided a method for processing a length of material using a material-working device comprising a first cutting device having a first cutting capacity, and a second cutting device having a second cutting capacity. The method may comprise receiving data relating to the length of the length of material and the diameter of the length of material at a plurality of points along its length. At least one cutting position may be set along the length of the length of material based on at least the data relating to the length of the length of material. The diameter of the length of material at the cutting position may be determined using at least the data relating to the diameter of the length of material at the plurality of points along its length. Either the first cutting device or second cutting device may be selected for use in cutting the length of material at the cutting position based at least in part on the cutting capacity of each cutting device and the diameter of the length of material at the cutting position.

According to another exemplary of the present disclosure there is provided an article of manufacture having computer storage medium storing computer readable program code executable by a computer to implement a method for operating a material-working device comprising a first cutting device having a first cutting capacity and a second cutting device having a second cutting capacity. The code may comprise computer readable program code receiving data relating to the length of the length of material and the diameter of the length of material at a plurality of points along its length. The code may comprise computer readable program code setting at least one cutting position along the length of the length of material based on at least the data relating to the length of the length of material. The code may comprise computer readable program code determining the diameter of the length of material at the cutting position using at least the data relating to the diameter of the length of material at the plurality of points along its length. The code may further comprise computer readable program code selecting either the first cutting device or second cutting device for use in cutting the length of material at the cutting position based at least in part on the cutting capacity of each cutting device and the diameter of the length of material at the cutting position.

In an exemplary embodiment the material-working device may be a timber-working device—in particular a harvester head, and may be referred to as such throughout the specification. Harvester heads typically have the capability to grapple and fell a standing tree, delimb and/or debark a felled stem, and cut the stem into logs. However, a person skilled in the art should appreciate that embodiments of the disclosure may be used with other timber-working devices having multiple cutting devices, for example a feller buncher, disc saw head, saw grapple, and so on—and that reference to the timber-working device being a harvester head is not intended to be limiting.

Also, reference will herein be made throughout the specification to the length of material as being the stem of a tree. It should be appreciated that while it is envisaged that embodiments of the disclosure may have particular application to the processing of a felled tree stem, this is not intended to be limiting. For example, embodiments of the disclosure may be used in the processing of other wood products—such as wood which has been sawn into boards—although embodiments of the disclosure may be applied to effectively any material where it is desirable to reduce the processing time in cutting the material into desired lengths.

In an exemplary embodiment, each cutting device may comprise at least one saw. It is envisaged that embodiments of the disclosure may have particular application to timber-working devices comprising chainsaws. Each chainsaw may comprise a saw chain, a saw bar around which the saw chain moves, and a saw drive gear for driving the saw chain around the saw bar. However, this is not intended to be limiting as the cutting device may take other forms—for example a disc saw, or shears.

Reference to cutting capacity should be understood to refer to the ability of a cutting device to cut the length of material being processed. In the context of a saw—particularly a chainsaw—cutting capacity may be influenced by the length or depth of material a saw is capable of cutting, and/or power rating. Generally, in the context of processing tree stems it may be desirable for a log to be cut using a single pass of the cutting device to ensure a clean cut and reduce processing time. As such, the diameter of the material being cut may be significant in determining whether the cutting capacity of a cutting device is sufficient to carry out a cut at a particular cutting position.

Harvester heads may comprise a main saw which is primarily used for the felling and cross cutting of stems. Further, some harvester heads may comprise a secondary or topping saw. The topping saw is typically of a lower specification than the main saw, and used primarily during processing once a tree is felled. The first cutting device and second cutting device may herein be referred to as the main saw and top saw respectively, although it should be appreciated that this is not intended to be limiting.

Harvester heads typically comprise a drive mechanism in the form of at least one driven roller—for example rollers mounted on grapple arms which grip the stem and control position of the stem relative to the saw or saws. The drive mechanism may allow the stem to be moved relative to the harvester head for debarking, delimbing, and sawing.

A distance measurement device may be incorporated into or associated with the drive mechanism, or a separate device. An example of a distance measurement device is a rotary encoded measuring wheel, which is rotated as a stem is driven relative to the harvester head. In the prior art, the encoder simply counts up or down depending on the direction in which it is being driven. It is envisaged that in embodiments of the disclosure the count may be based on the direction for processing of a cutting solution.

In an embodiment the harvester head may measure other characteristics of the stem. In embodiments, the harvester head may measure diameter of the stem. It is known to measure diameter using deflection of the delimbing knives, or drive arms. Other characteristics such as stiffness or strength may also be measured, for example as described in New Zealand Patent No. 545247 titled "Method and apparatus for assessing or predicting the characteristics of wood", the contents of which are hereby incorporated by reference.

In an exemplary embodiment, setting the cutting position comprises the processor determining the cutting position along the length of the length of material using at least the data relating to the length of the length of material.

However, it is envisaged that in some embodiments the operator may have the option to manually determine the next cutting position based on the length measurement, and provide this as an input to the processor. While it may be generally desirable to automate such decision making, it may be advantageous to allow for the possibility of the operator using their experience to pre-empt or overrule automated solutions.

In an exemplary embodiment a plurality of cutting positions along the length of the length of material are determined. The plurality of cutting positions may be determined as part of a value optimization process for the stem. It is known in the art for timber processing systems to automatically determine the optimal position of saw cuts in order to maximize the value of a particular stem.

In addition to length, the value of a log may comprise factors such as diameter and grade. A value matrix typically uses these measured or observed variables together with market prices to determine the most valuable combination of logs which may be obtained from the stem. Optimization may also account for targeted length and diameters for a particular stand of trees, which meets the demands of the forest owner while perhaps not producing the highest dollar value combination based on market values.

It is envisaged that the cutting positions may be determined such that the end of the stem with the larger diameter is prioritized over the end with the lesser diameter. While this is not intended to be limiting, it is envisaged that in doing so wastage may be reduced.

It should be appreciated that determining the diameter of the stem at a cutting position may comprise approximating the diameter at that position based on measurements made on either side of the cutting position along the length of the stem. It is envisaged that diameter measurements may be made at intervals along the length of the stem (for example, every 100 millimeters approximately), and that deviation of diameter within these intervals is unlikely to be significant for the purpose of comparison with the cutting capacities of the cutting devices.

In some embodiments, the system may select the cutting device having the greater cutting capacity when the predicted diameter is within the cutting capability of the other cutting device, but also within a predetermined margin of error.

In an exemplary embodiment, the processor may be configured to determine the order in which the cutting positions are to be cut. Determining the order in which the cutting positions are to be cut may be based at least in part on distance the harvester head would be required to travel relative to the length of material—in particular the minimum travel required. In doing so it is envisaged that the time required to process a stem may be reduced, along with fuel consumption and operating stresses on the equipment. Damage to the stem may also be reduced, preserving its value. By automating this process, operator requirements may also be reduced—in turn reducing mental stress and associated fatigue.

It should be appreciated that determining the minimum distance may be influenced by other factors. For example, the minimum distance may be determined based on the requirement that the remaining length of the stem remains held by the harvester head—such that the operator does not need to pick up a length of stem which has been cut off in order to finish processing that length. Preferably, the cutting order is determined based in part on the requirement that the stem remain held by the harvester head until the final cutting position has been cut.

In an exemplary embodiment, if any of the cutting positions are beyond the cutting capacity of a cutting device, the other cutting device may be selected to cut the stem at all of the cutting positions.

The processor may be configured to control the harvester head to align the selected cutting device with the associated cutting position. When aligned at the cutting positioned, the system may require manual activation of the selected cutting device by the operator. In another embodiment the system may automatically control operation of the cutting device at the cutting position.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The various illustrative logical blocks, modules, circuits, and algorithm steps described in connection with the embodiments disclosed herein may be implemented by a programmed processor executing instructions stored in memory. The functions, acts or tasks are independent of the particular type of instructions set, storage media, processor or processing strategy and may be performed by software, hardware, integrated circuits, firm-ware, micro-code and the like, operating alone or in combination.

The memory may comprise computer-readable media. The term "computer-readable medium" may comprise a single medium or multiple media, such as a centralized or distributed database, and/or associated caches and servers that store one or more sets of instructions. The term "computer-readable medium" may also comprise any medium that is capable of storing, encoding or carrying a set of instructions for execution by a processor or that cause a computer system to perform any one or more of the methods or operations disclosed herein. The "computer-readable medium" may be non-transitory, and may be tangible.

It should be appreciated that in exemplary embodiments one or more dedicated hardware implementations, such as application specific integrated circuits, programmable logic arrays and other hardware devices, can be constructed to implement one or more of the methods described herein. One or more embodiments described herein may implement functions using two or more specific interconnected hardware modules or devices with related control and data signals that can be communicated between and through the modules, or as portions of an application-specific integrated circuit.

BRIEF DESCRIPTION OF THE DRAWINGS

Embodiments of the present disclosure may be better understood with reference to the following description and accompanying drawings, which are given by way of example only.

DETAILED DESCRIPTION

Figure 1A:
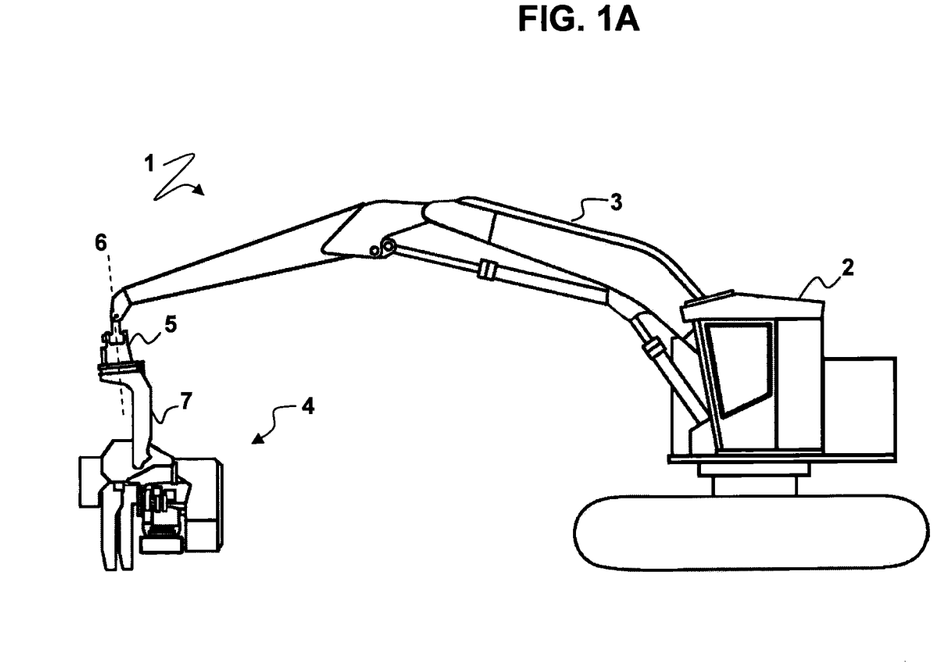
FIG. 1A is a side view of an exemplary material-working system comprising an exemplary material-working device in the form of a forestry head.

FIG. 1A illustrates a timber-working system comprising a carrier 1 for use in forest harvesting. The carrier 1 comprises an operator cab 2 from which an operator (not shown) controls the carrier 1. The carrier 1 further comprises a boom assembly 3, to which a timber-working device in the form of a forestry head 4 is connected.

Connection of the head 4 to the boom assembly 3 comprises a rotator 5, configured to rotate the head 4 about the generally vertical axis of rotation marked by dashed line 6. A tilt bracket 7 further allows rotation of the head 4 between a prone position (as illustrated) and a standing position.

Figure 1B:
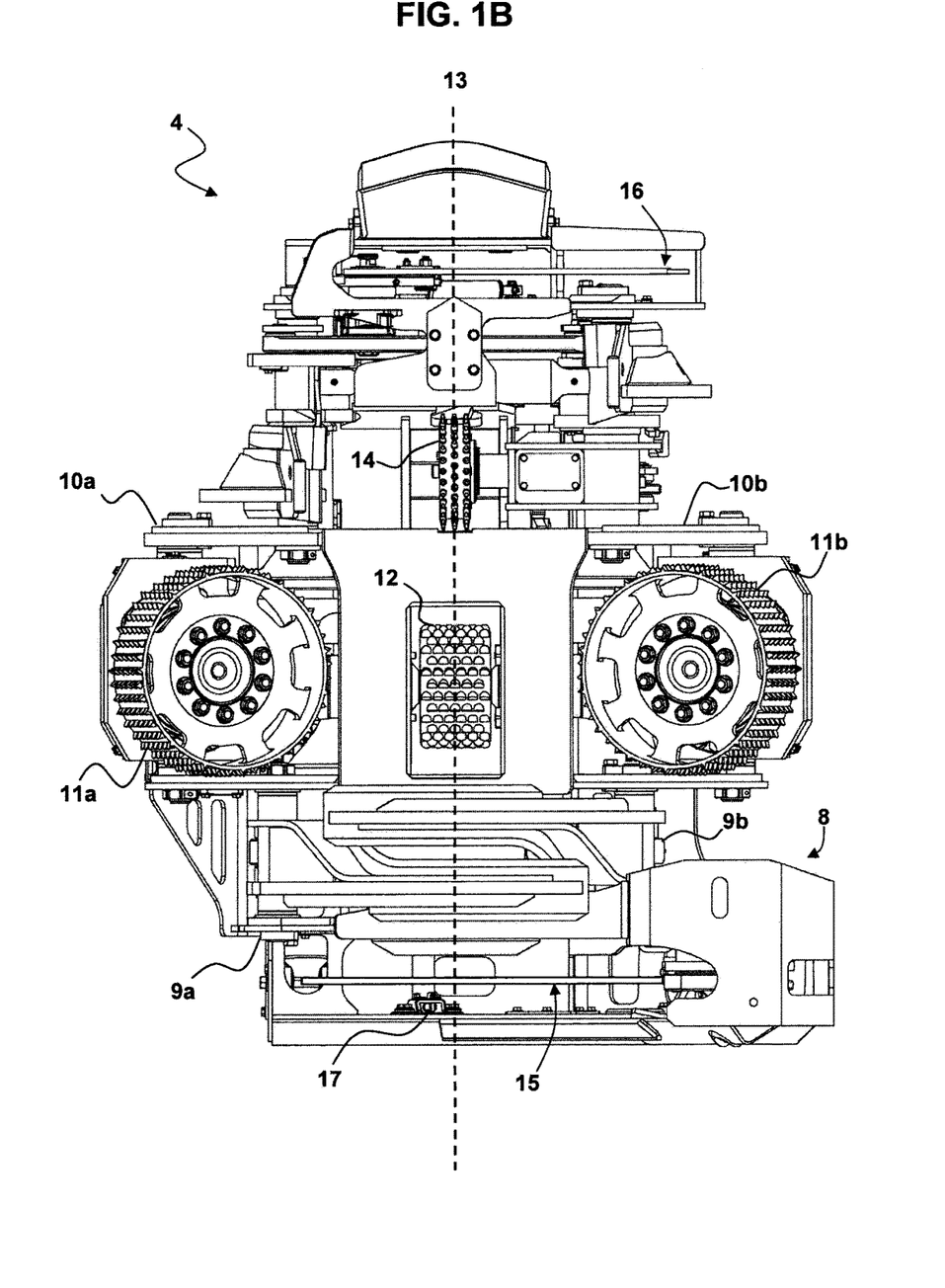
FIG. 1B is an elevated view of the forestry head.

Referring to FIG. 1B, the head 4 comprises a frame 8 to which the tilt bracket 7 of FIG. 1 is pivotally attached. Right hand (RH) and left hand (LH) delimb arms 9a and 9b are pivotally attached to the frame 8, as are opposing RH and LH feed arms 10a and 10b. RH and LH feed wheels 11a and 11b are attached to RH and LH drive arms 10a and 10b respectively, which together with a frame-mounted feed wheel 12 may be controlled to feed one or more stems (not illustrated) along feed axis 13 of the head 4. Feed wheels 11a, 11b, 12 are driven by hydraulic motors, and may collectively be referred to as the 'feed mechanism.' The displacement of the delimbing arms 9a or 9b and/or feed arms 10a or 10b may be used to determine the diameter of the stem at that point.

A measuring wheel 14 may be used to measure the length of stems processed by the head 4. The measuring wheel 14 may be selectively raised and lowered into contact with the stems as desired. Alternatively, rotation or runtime of the feed wheels 11a or 11b, may be used to measure the length of the stem as it is driven relative to the head 4.

A main chainsaw 15, and a topping chainsaw 16, are attached to the frame 8. The main saw 15 is typically used to fell a tree when the head 4 is in a harvesting position, and to buck stems into logs in the processing position of the head 4 (as seen in FIG. 1A). The topping saw 16 may be used to cut off a small-diameter top portion of the stem(s) to maximize the value recovery of the trees. The main saw 15 has a greater cutting capacity in terms of the diameter of stem it is capable of sawing through than the topping saw 16.

An optical sensor 17 is positioned at the end of the head 4 next to the main saw 15. The optical sensor 17 may be used to locate an end of a stem as it is driven through the head 4.

Figure 2A:
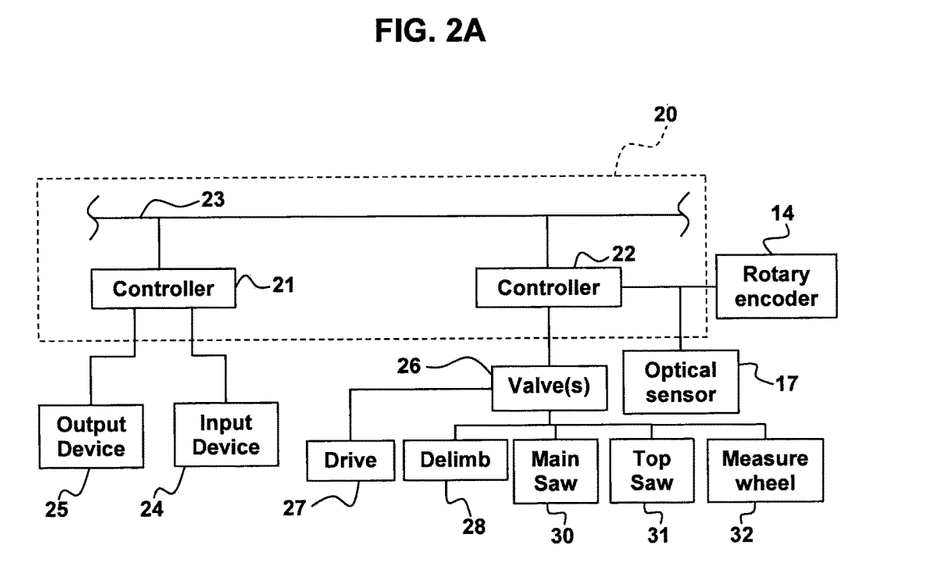
FIG. 2A is a diagrammatic view of an exemplary control system for the exemplary material-working system.
Figure 2B:
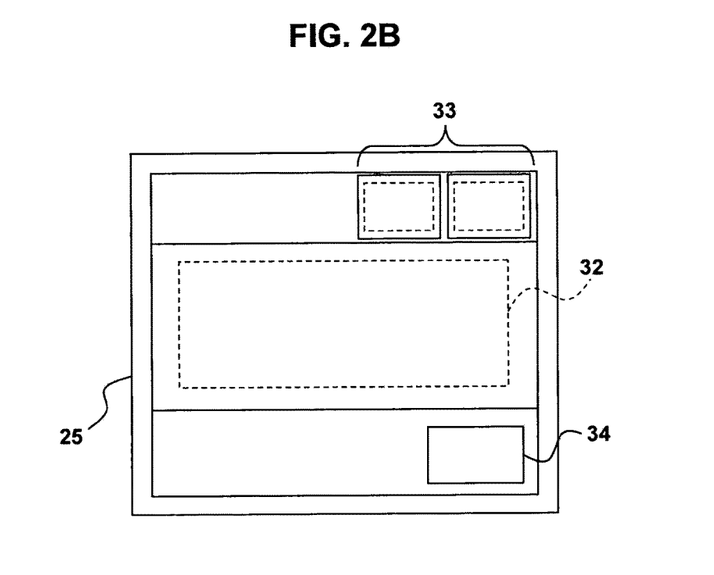
FIG. 2B illustrates an exemplary display device as part of the exemplary control system.

The various operations of the head 4 may be controlled by the operator using hand and foot controls as known in the art. Further, certain automated functions of the harvester head 4 may be controlled by an electronic control system 20 as shown by FIG. 2A and FIG. 2B.

The control system 20 comprises one or more electronic controllers, each controller comprising a processor and memory having stored therein instructions which, when executed by the processor, causes the processor to perform the various operations of the controller.

For example, the control system 20 comprises a first controller 21 on board the carrier 1 and a second controller 22 on board the head 4. The controllers 21 and 22 are connected to one another via a communications bus 23 (e.g., a CAN bus).

A human operator operates an operator input device 24, for example hand and foot controls, located at the operator's cab 2 of the carrier 1 to control the head 4. Details of operation are output to an output device 25—for example a display device. Certain automated functions may be controlled by first controller 21 and/or second controller 22.

The head 4 has a number of valves 26 arranged, for example, in a valve block and coupled electrically to the second controller 22 so as to be under its control. The valves 26 comprise, for example, drive valves 27 configured to control operation of the motors associated with the RH and LH feed wheel 11a and 11b, and frame-mounted feed wheel 12a.

The valves 26 further comprise delimb drive valves 28 for controlling operation of the delimb arms 9a and 9b, main saw drive valve 29 and topping saw drive valve 30 for controlling operation of the saws 15 and 16 respectively, and measuring wheel valves 31 for controlling the transfer of the measuring wheel 14 between its extended and retracted positions.

FIG. 2B illustrates an exemplary display device 25 on which details of the operations of the head 4 may be displayed. For example, information regarding the current log to be cut from the stem may be presented in the central area 32. The next logs in the sequence may be displayed in a queuing area 33. The currently selected saw may be displayed in an icon 34.

Figure 3:
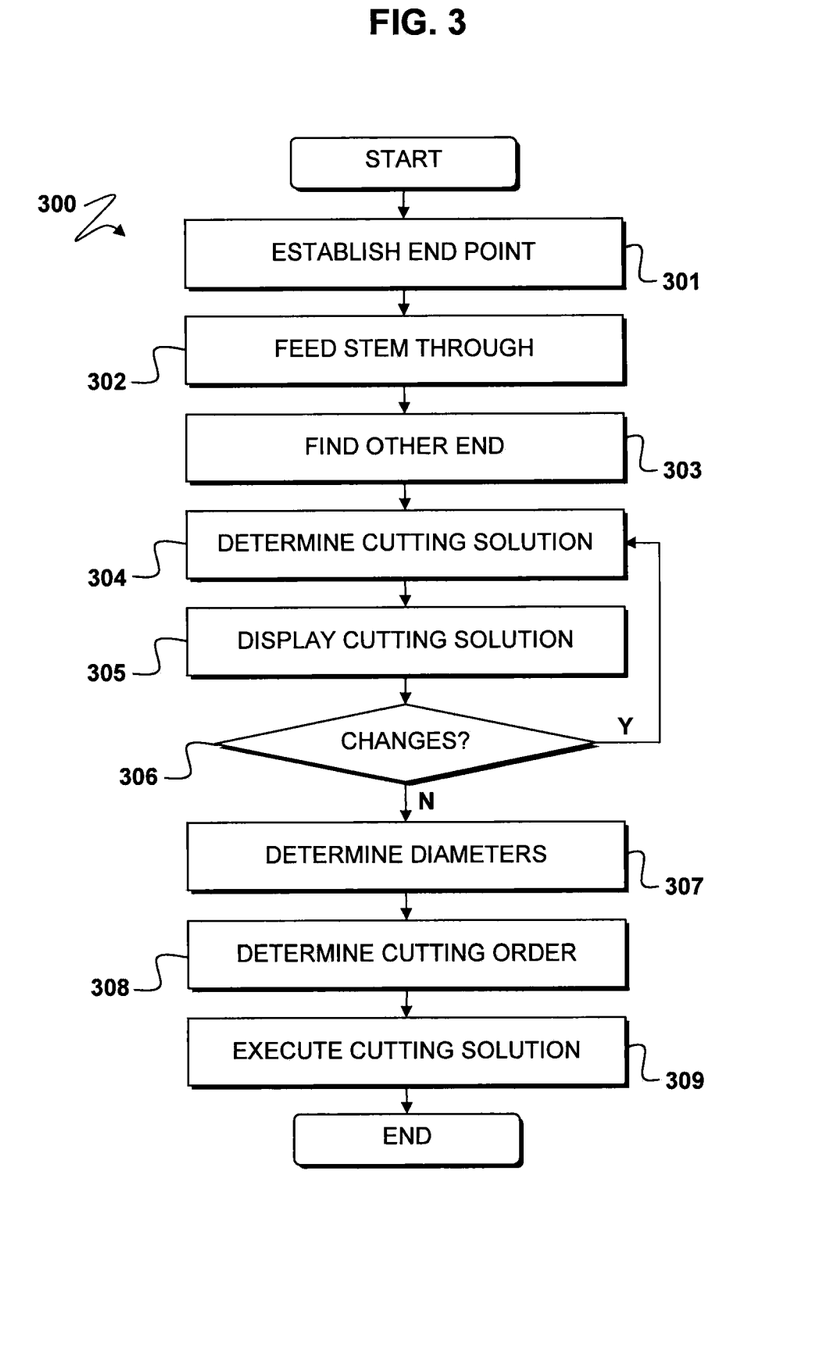
FIG. 3 is a flowchart illustrating an exemplary method for processing a length of material such as a tree stem using the exemplary system.

Referring to FIG. 3, the control system 20 is configured to implement exemplary method 300, which will be described with reference to FIG. 1A, FIG. 1B, FIG. 2A, and FIG. 2B.

At step 301, an end of the stem is found using the optical sensor 17—preferably the Large End Diameter. The stem is delimbed by a human operator operating the input device 24 to cause the first controller 21 to broadcast a command on bus 23 to feed the stem, which is in turn received by the second controller 22 which outputs control signals to drive valves 27 causing the wheels 11a, 11b, and 12 to feed the stem in the desired direction through the delimb arms 9a and 9b.

In step 302, while the stem is being fed through, the second controller 22 receives signals from the distance measuring wheel 14 indicating the distance travelled. Diameter measurements are also taken at 100 millimeter intervals using deflection of the delimb arms 9a or 9b and/or feed arms 10a or 10b. These measurements are transmitted to the first controller 21 over the bus 23.

At step 303 the other end of the stem is identified—whether through determination that a minimum diameter has been reached, or on manual designation by the operator via input device 24.

In step 304, the first controller 21 uses the measured length and diameters to determine at least one cutting position along the length of the stem such that the value of the resulting logs is optimized.

These are displayed to the operator on display device 25 in step 305, who can choose to make changes in step 306—for example changing the grade of the stem. Those changes may require re-optimization of the cutting solution by the first controller 21.

If the operator approves the cutting solution, then the first controller 21 determines the diameter of the stem at the cutting positions at step 307.

At step 308 the first controller 21 then determines the order in which the cutting positions are to be cut based on the minimum distance the head 4 will be required to travel relative to the stem while maintaining control of the stem using the feed rollers 11a, 11b, and 12. This comprises selecting either the main saw 15 or top saw 16 to make each cut based on the cutting capacity of the saws and the diameter of the stem at each cutting position.

At step 309 the first controller 21 broadcasts control signals for carrying out the cutting solution on the bus 23. The second controller 22 receives the control signals, and controls the drive valves 27 to cause feed wheels 11a, 11b, and 12 to drive the stem to each cutting position, where the second controller 22 awaits activation of the selected saw 15 or 16 by the operator before executing the cut and proceeding to the next cutting position. In another embodiment the second controller 22 may cause the saw 15 or 16 to be automatically activated at each position unless overridden by the operator.

Figure 4A:
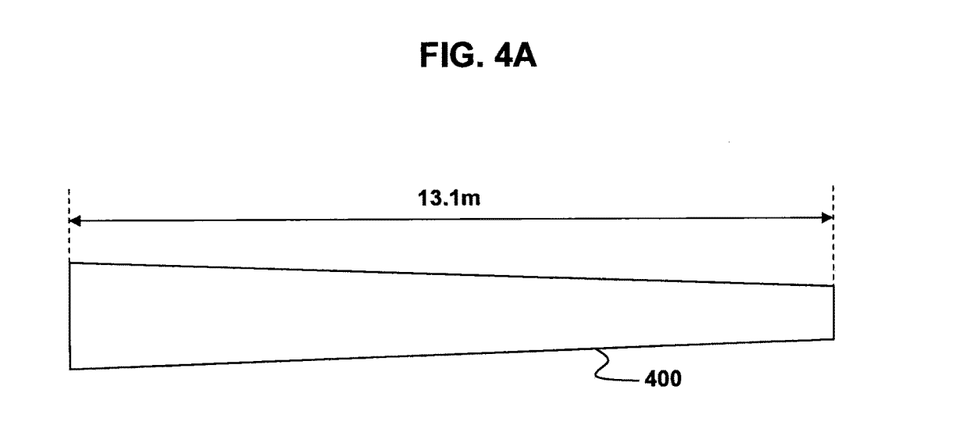
FIG. 4A illustrates a exemplary stem to be processed according to an exemplary method of the present disclosure.
Figure 4B:
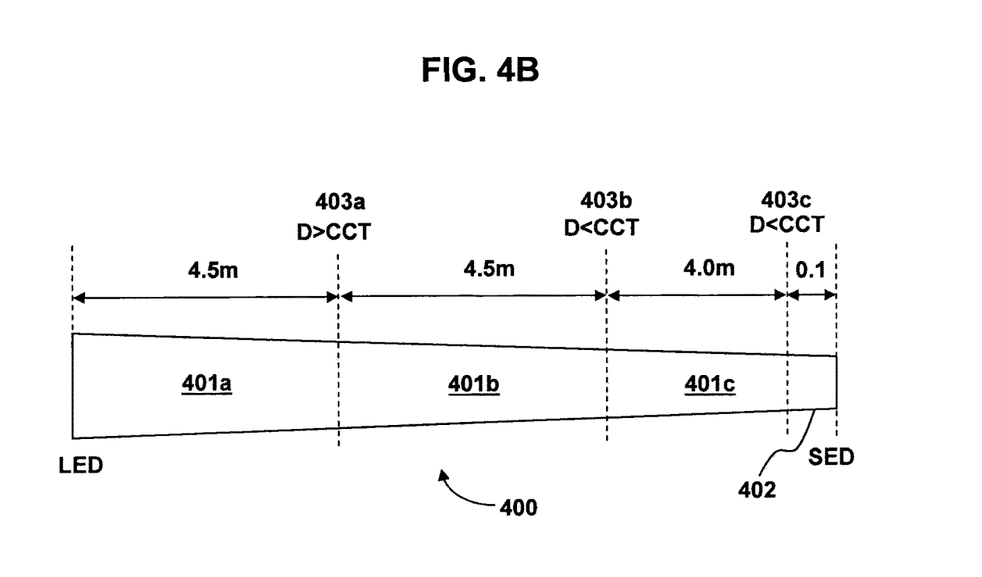
FIG. 4B illustrates a cutting solution for the stem according to an embodiment of the present disclosure.

FIG. 4A and FIG. 4B illustrates an exemplary cutting solution for optimizing value of a stem and reducing processing time for same. FIG. 4A illustrates a stem 400 having a measured length of 13.1 m.

Exemplary values of various log lengths are outlined in the following Table 1:

TABLE 1

| Log length (m) | Value ($) |
|---|---|
| 4.0 | 500 |
| 4.5 | 550 |
| 5.0 | 400 |
| 5.5 | 450 |
| 6.0 | 500 |
| 6.5 | 550 |
| 7.0 | 600 |
| 12.0 | 950 |

For ease of illustration the value of logs are determined based solely on length, without factoring diameter into the equation.

Table 2 outlines exemplary calculated cutting priorities for the stem 400 based on the values shown in Table 1:

TABLE 2

| Priority | Value ($) | Log Composition | Total Length (m) |
|---|---|---|---|
| 1 | 1600 | 2 × 4.5 m; 1 × 4.0 m | 13.0 |
| 2 | 1550 | 1 × 4.5 m; 2 × 4.0 m | 12.5 |
| 3 | 1500 | 3 × 4.0 m | 12.0 |

In FIG. 4B it may be seen that in addition to logs 401a, 401b and 401c, a waste portion 402 is produced by cutting solution priority 1. Cutting positions 403a, 403b and 403c are also marked.

Using standard prior art control techniques, the stem 400 would be driven from a position in which the top saw 16 was substantially aligned with the Small End Diameter (SED) to a position in which the main saw 15 was substantially aligned with the Large End Diameter (LED). The stem would then be driven to align the main saw 15 with cutting position 403a, and log 401a cut. The stem would then be driven to align the main saw 15 with cutting position 403b, and log 401b cut. The stem would then be driven to align the top saw 16 with cutting position 403c, and log 401c cut.

Designating the distance between the main saw 15 and the top saw 16 on the harvester head 4 as X, the total distance travelled (d) using the prior art technique in this example may be calculated as:

$d=(13.1 \text{ m}-X)+4.5 \text{ m}+4.5 \text{ m}+(4.0 \text{ m}-X)=26.1 \text{ m}-2X.$ In turn, using the exemplary control method 300 the diameter (D) of the stem at cutting positions 403a, 403b and 403c is compared with the cutting capacity of the top saw 15 (CCT). In this example, it is determined that the diameter of the stem at cutting positions 403b and 403c is less than the cutting capacity of the top saw 15. Only cutting position 403a requires cutting using the main saw 16.

Starting from the same position as the example discussed above, the stem 400 would be driven from a position in which the top saw 15 was substantially aligned with the SED to a position in which the top saw 15 aligned with cutting position 403c, and the waste portion 402 cut. The stem would then be driven to align the top saw 15 with cutting position 403b, and log 401c cut. The stem would then be driven to align the main saw 16 with cutting position 403a, and logs 401a and 401b cut.

The total distance travelled (d) using the exemplary method 300 may be calculated as:

$d=0.1 \text{ m}+4.0 \text{ m}+(4.5 \text{ m}-X)=8.6 \text{ m}-X.$

Using the present disclosure, in this example the harvester travels 17.5 m (less the distance between saws) less than previously required.

Aspects of the present disclosure have been described by way of example only and it should be appreciated that modifications and additions may be made thereto without departing from the scope thereof as defined in the appended claims.

What is claimed is:

1. A system for processing a stem of a tree, comprising:
   a material-working device, comprising:
      a frame having a feed axis;
      a first cutting device having a first cutting capacity, wherein the first cutting device is attached to the frame and is configured to be controlled to perform a cross-cut at a first position along the feed axis;

a second cutting device having a second cutting capacity, wherein the second cutting device is attached to the frame and is configured to be controlled to perform a cross-cut at a second position along the feed axis;

a drive mechanism configured to drive the stem along the feed axis of the frame;

at least one distance measuring device configured to measure a length of the stem as the stem is driven by the drive mechanism; and at least one diameter measuring device configured to measure a diameter of the stem; and at least one processor configured to:

receive data relating to the length of the stem from the distance measuring device;

receive data relating to the diameter of the stem at a plurality of points along the length of the stem from the diameter measuring device;

set a plurality of cutting positions along the length of the stem based on at least the length of the stem;

determine, for each of the plurality of cutting positions, a cutting position diameter of the stem at the cutting position using at least the data relating to the diameters of the stem at the plurality of points along its length; and select either the first cutting device or the second cutting device for use in cross-cutting the stem at each of the cutting positions based at least in part on the cutting capacity of each cutting device and the cutting position diameter of the stem at the cutting position, wherein the selection of either the first cutting device or second cutting device for use in cross-cutting the stem at each of the cutting positions is also based at least in part on minimizing a total distance the stem travels when driven along the feed axis to align each of the cutting positions with one of the first cutting device or the second cutting device.

2. A system as claimed in claim 1, wherein setting at least one of the plurality of cutting positions comprises receiving a manual input from an operator.

3. A system as claimed in claim 1, wherein setting the plurality of cutting positions comprises the processor determining each of the cutting positions along the length of the stem using at least the data relating to the length of the stem.

4. A system as claimed in claim 1, wherein the processor is configured to determine the plurality of cutting positions as part of a value optimisation process for the stem.

5. A system as claimed in claim 1, wherein the processor is configured to determine the cutting positions such that an end of the stem having a larger diameter is prioritised over the other end.

6. A system as claimed in claim 1, wherein the processor is configured to determine the order in which the cutting positions are to be cut.

7. A system as claimed in claim 6, wherein the processor is configured to determine the order in which the cutting positions are to be cut based at least in part on distance the material-working device would be required to travel relative to the stem.

8. A system as claimed in claim 6, wherein the processor is configured to determine the order in which the cutting positions are to be cut based in part on a requirement that the stem remain held by the material-working device until a final cutting position has been cut.

* * * * *